United States Patent [19]

Cholin et al.

[11] Patent Number: 4,464,575

[45] Date of Patent: Aug. 7, 1984

[54] TEST DEVICE FOR AN OPTICAL INFRA RED DETECTOR

[75] Inventors: John M. Cholin, Oakland, N.J.; Jeffrey G. Cholin, Pound Ridge, N.Y.; Ray Voorhis, Midland Park, N.J.

[73] Assignee: Firetek Corporation, Hawthorne, N.J.

[21] Appl. No.: 529,276

[22] Filed: Sep. 6, 1983

[51] Int. Cl.³ .............................................. G01V 5/00

[52] U.S. Cl. ................................ 250/554; 250/237 R; 340/578

[58] Field of Search ................... 250/554, 237 R, 215, 250/339; 340/578

[56] References Cited

U.S. PATENT DOCUMENTS 3,739,365 6/1973 Müller ................................ 250/554

4,322,723 3/1982 Chase .................................. 340/578

4,370,557 1/1983 Axmark et al. ...................... 250/554

*Primary Examiner*—David C. Nelms

*Assistant Examiner*—J. Brophy

*Attorney, Agent, or Firm*—W. Patrick Quast

[57] ABSTRACT

A test device for a multiple channel infra red detector utilizing photocells comprising an aperture plate mounted on the housing member of the detector. In the embodiment described a test lamp is mounted on a surface portion of the aperture plate in fixed relationship with two openings in the plate which are concentrically disposed about the two photocells. The test system utilizes the characteristic of the dual channel detector that the ratio of the response of each of the two cells to emissions in the infra red range (as received from a fire) is a certan value. The opening associated with one of the cells is larger in the path between the lamp and that cell so that more light energy impinges on it. The electrical energy to the lamp is increased until a level is reached where the ratio of the response of the one cell to the response of the other cell simulates the responses of the two when monitoring a fire. The warning system is triggered. A numerical value can be determined which is indicative of the sensitivity of the detector and which is repeatable.

9 Claims, 6 Drawing Figures

TEST DEVICE FOR AN OPTICAL INFRA RED DETECTOR

TECHNICAL FIELD

This invention relates generally to self-contained test devices particularly useful in checking the sensitivity of a dual channel, optical fire or explosion detection system.

BACKGROUND

Utilization of infra-red detectors for detecting the presence of fire or explosions has been going on for several years. Various type systems are disclosed in U.S. Pat. Nos. 4,220,857, 3,665,440, 3,931,521, 3,825,754, 3,724,474 and 3,859,520. A system employing a dual chanel detecting scheme is disclosed in our co-pending application entitled OPTICAL FIRE or EXPLOSION DETECTION SYSTEM and METHOD. This system detects the presence of fire by processing received signals emitting from fires in the 4.3 micron and 3.8 micron series. The processing includes circuitry to detect the so-called flicker frequency of the fire.

These detectors are typically located in areas such as air craft hangars, gasoline loading racks, petrochemical plants, on-shore and off-shore oil and gas production sites and the like. The detectors more often than not, are located out of doors, where they are exposed to the elements and whatever pollution there may be in the ambient air. Consequently, the optical windows of these detectors often become occluded with foreign material. This foreign material is often highly absorbent in the ultra-violet portion of the spectrum and somewhat absorbent in the infra-red portion of the spectrum and therefore, can very likely mitigate the ability of the detector to detect a fire. Therefore, it is critical that the sensitivity of the detector be able to be checked.

The inventors are aware of single channel infra-red detectors with built in test lights. Also, ultraviolet detectors exist in which the sensitivity's checked by using some kind of reflection of radiation from an internal light source back into the detector.

Inasmuch as the multiple channel infra-red detector measures the light in each of two or more bands of the infra-red spectrum, any means of checking the sensitivity must provide different levels of light in the two or more bands of the infra-red spectrum which would be analogous to what exists when a flame is present. This represents a particularly difficult engineering problem because the only light sources available that can provide light in the infra-red portion of the spectrum are incandescent lamps. However, infra-red detectors, in order to be useful, must be able to ignore black body radiative sources such as incandescent lamps. Consequently, a technique which uses an incandescent lamp would on the surface be fruitless.

It is therefore a primary object of this invention to disclose a built-in test device for checking the sensitivity of a multiple channel, infra-red detection system.

It is a further object of the invention to employ an incandescent lamp, or other light source with a spectral output appropriate to the spectrum being measured by the detector, to provide a simple test device which will give realistic numerical data on the sensitivity of the detector.

DISCLOSURE OF THE INVENTION

Towards the accomplishment of these and other objects which will become more readily apparent after studying the accompanying drawings and following description, there is disclosed a test system for a multiple channel optical, infra red detecting system including first and second photocell devices. Each photocell device has a peak response to radiation emissions at respective wavelengths. The ratio of the emission at the peak response wavelength of the first photocell device to the emission at the peak response wavelength of the second photocell device equals a certain value when the emissions emanate from a fire. The detecting system responds to that ratio to give a warning signal. The detecting system includes a housing for containing the photocells which orient them in axial alignment such that both cells receive radiation emissions when the system is in place. The test system includes an aperture plate including first and second openings mounted at the end of the housing, the openings concentrically disposed about and aligned with the photocells so that the cells are exposed to incident radiation. The opening for the first cell is different than the opening for the second cell. A test lamp is positioned in the housing in fixed relationship to each of the openings and hence the cells therein. Variable electrical power means is supplied to the test lamp filament whereby the light output of the test lamp is varied up to a threshold amount where the detecting system's warning signal is triggered. The test lamp is typically an incandescent lamp which is mounted adjacent to the aperture plate. The necessary different opening surrounding the first photocell is accomplished by including an arcuate cutout in this embodiment on its periphery in line between the lamp and the cell active area so that a larger total radiant flux falls on the active area of the photocell beneath the asymmetric aperture than on the cell beneath the symmetric aperture.

DESCRIPTION OF THE BEST MODE

Figure 1:
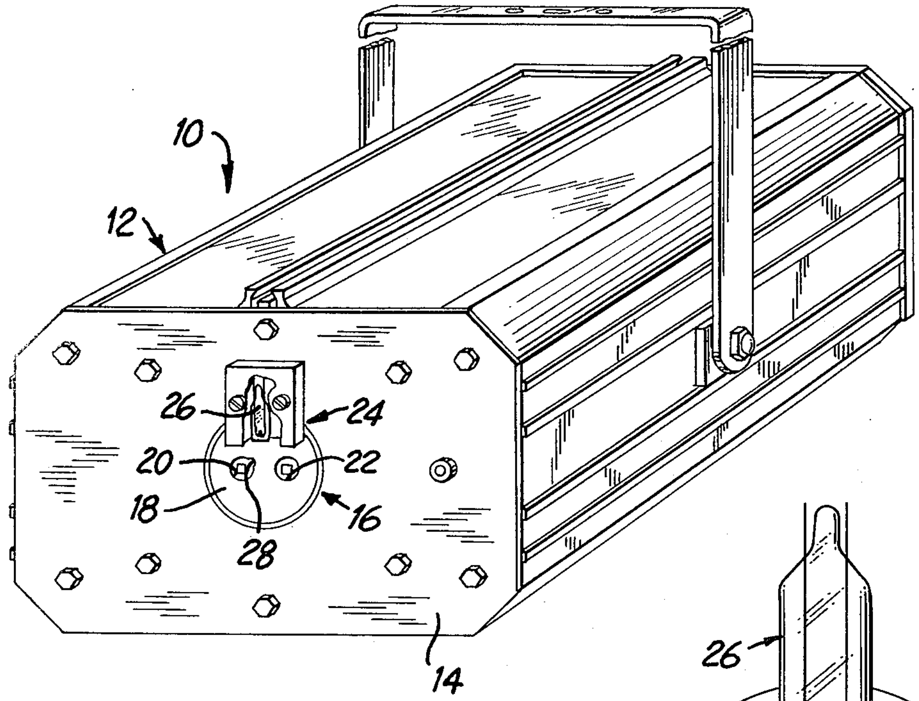
FIG. 1 is a perspective drawing of a dual channel detection device including a test system in accordance with the present invention mounted thereon.

FIG. 1 shows a physical embodiment of a dual channel, infra-red fire detection system such as described in our co-pending application entitled Optical Flame or Explosion Detection System and Method.

The detection system 10, includes a housing member 12 in which is packaged the photocells and support electronic circuitry. Capping one end of the housing member 12 is an end plate 14. This includes a central opening 16 which is sealed with an aperture plate 18.

The aperture plate 18 includes two openings 20 and 22. Aligned with the openings are the two photocell units comprising the front end of the detection system described in the aforementioned, co-pending application.

In order to understand better the present invention, a brief discussion of our co-pending application is appropriate.

In accordance with the principles described in that application, each of the photocells has a different peak frequency or wavelength response. The cell positioned behind opening 20 has a peak response typically of 4.3 microns; and the cell positioned behind opening 22 has a peak response typically of 3.8 microns.

As described in the co-pending application, the photocells respond to wavelengths which characterize hydrocarbon fires. The detection system receives electronic signals from the photocells and electronically processes the signals via two channels such that ultimately a comparison is made between the two signals to determine if a ratio of channel A (4.3$\mu$) to channel B (3.8$\mu$) has been exceeded. If the ratio between the signals is exceeded, then the output of the differential circuit is processed further to determine whether the signal represents a fire condition.

Returning to the test device, positioned on the end plate 14 is a test lamp housing 24. Contained within the housing is a test light 26. This is an incandescent lamp. The latter is secured and oriented in the lamp housing so as to emit infra-red radiation towards the cells in openings 20 and 22. The lamp is symmetrically disposed in relationship to the two openings 20 and 22. Thus, when the lamp is powered, the radiation directed towards the openings is substantially equal. As noted above, to stimulate an actual fire any means of checking the sensitivity of an infra-red, dual channel detector must provide different levels of light at the two wavelengths of the infra red spectrum.

In order to provide different levels of radiation incident on the two photocells, opening 20 is enlarged in the path between the lamp 20 and the cell. In the described embodiment, the periphery of opening 20 includes an arcuate notch 28. As will be seen most clearly from FIG. 3, this allows for a greater incidence of radiation on the 4.3 micron cell.

Figure 2:
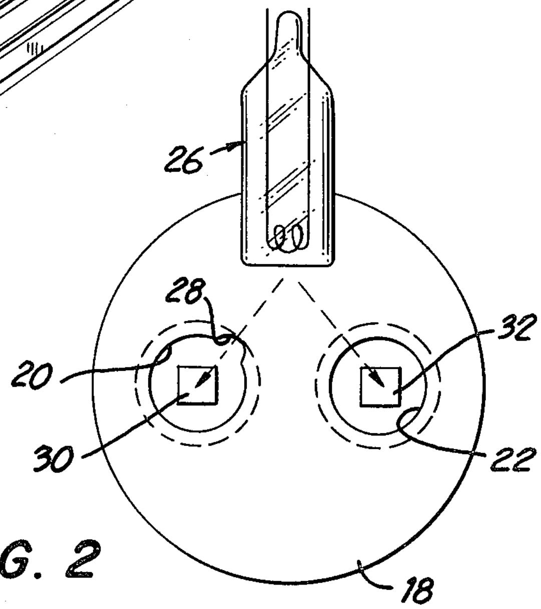
FIG. 2 is a functional plan view depicting various elements of the present invention and their relationship to each other.

FIG. 2 is a close up view depicting the relative location of the test lamp 26; openings 20 and 22; the active area of the 4.3 micron cell, 30; the active area of the 3.8 micron cell; 32; and the arcuate cutout 28 in the periphery of the opening 20. Note the symmetrical alignment between the bulb and the active areas of the cells which are precisely aligned behind the openings 20 and 22 in the aperture plate 18.

Figure 3A:
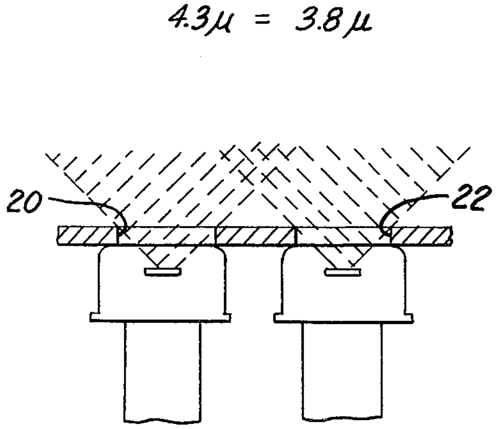
FIG. 3 is a schematic, elevation view showing the effective field of view of the photocell elements of the detection device to a distant source and to the test light.
Figure 3B:
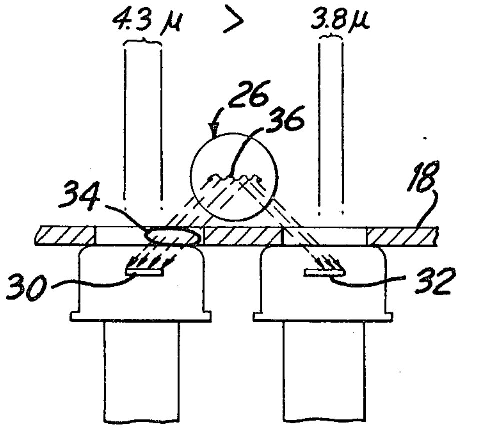

FIG. 3(*a*) depicts the "cone of vision" or effective field of view of the active areas of both the 4.3 micron cell and the 3.8 micron cell. For "distant" fires, the arcuate cutout in the periphery of opening 20, has an inconsequential effect on the amount of radiation incident on the active area of the cell. FIG. 3(*b*) depicts the effects of the proximate test lamp on each of the active areas of the two cells. Because of the arcuate cutout 28, again lying directly in the path between the lamp and the active area, more of the active area 30 of the 4.3 micron cell is exposed to the radiation than the area 32 of the 3.8 micron cell. Thus the electrical signal in the 4.3 channel is greater. The size of the cutout and relative placement of the bulb in relationship to the cutout and openings are such that the ratio of the 4.3 micron signal to the 3.8 micron signal for a fire can be approximated.

Figure 4:
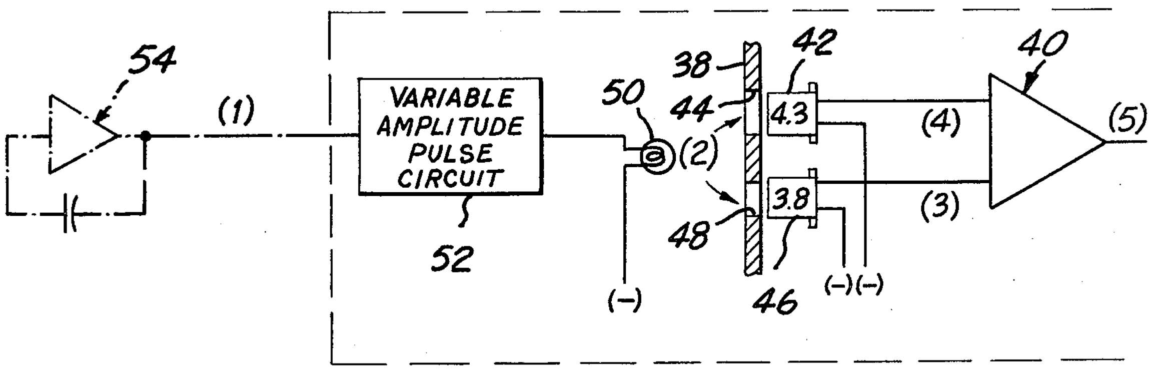
FIG. 4 is a schematic of a test circuit used to drive the test lamp for test purposes.

FIG. 4 depicts in schematic form a circuit arrangement for checking the sensitivity of a detector circuit, as for example, described in our co-pending application. The detector circuit as described in that application is depicted functionally to the right of aperture plate 38 as viewed in FIG. 4. Point (5) at the output of the functional circuit 40 corresponds to the output 64 of the differential ratio detection circuit 13 disclosed therein.

The 4.3 micron photocell 42 is aligned with opening 44. The 3.8 micron photocell 46 is aligned with opening 48. Opening 44 is less restrictive to radiation emanating from test lamp 50, than opening 48. This is shown schematically by a larger opening.

Figure 5:
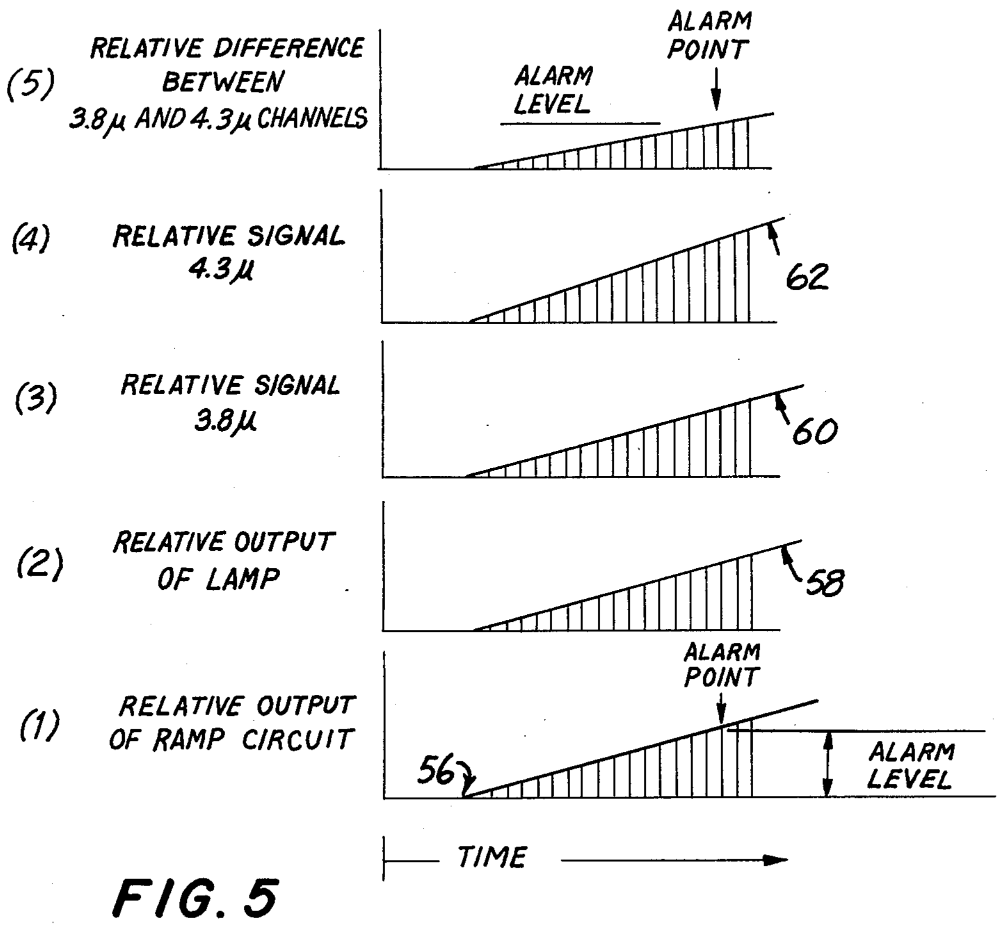
FIG. 5 are graphs of waveforms at various points in the test circuit or detection circuit as depicted in FIG. 4.

The filament of the test lamp is driven by a variable amplitude pulse circuit, 52 which converts the voltage ramp from ramp circuit 54 into pulses of successively greater voltage. The ramp voltage at point (1) in FIG. 4, is shown at FIG. 5(1). The voltage drive to the lamp 50 results in an output of the lamp as depicted in FIG. 5 (2). The lamp output begins to increase as the ramp level is reached at point 56 on the curve. Again, this is a pulsating output having a ramp envelope 58, or an increasing continuous signal when used with a D.C. coupled detector.

FIG. 5 (3) and FIG. 5 (4) depict the responses of the 3.8 micron cell and 4.3 micron cell respectively at the input of the circuitry 40. The amplitude envelope 60 of the 4.3 micron cell is greater in magnitude at any given point in time than the amplitude envelope 62 of the 3.8 micron cell.

As the wattage of the pulses supplied to the lamp is increased, the relative difference between the two cell outputs (and corresponding electrical signals) increases. See FIG. 5 (5). Eventually the alarm point is reached. This occurs at the alarm level where the difference in light between the two channels due to the asymmetric aperture will be large enough to cause the detector to go into the alarm state.

Since it is known what voltage and current through the test light is necessary to alarm the detector, a numerical value can be derived from the lamp voltage which is indicative of the detector sensitivity.

Since the lamp is secured to the housing of a particular detector and its relationship to the aperture openings is fixed, the numerical value is repeatable and thus provides a simple way of checking the sensitivity of the detector.

The pulse circuit is utilized by the present applicants because of the specific application of the test device to the detector system described in the copending application identified above. That system utilizes photcells which are inherently a.c. coupled in the input channels. Pulse circuitry however is not an absolute requirement. If d.c. type cells, e.g. photoconductive cells, are employed and the support circuitry is otherwise responsive to d.c., application of a variable d.c. signal alone is sufficient to effect the purposes of the invention.

The firing of the lamp can be done from a remote location through the detection system wiring. This protects personnel from the hazards of a monitored area. Or, alternately the ramp generator and variable amplitude pulse circuit can be packaged in the detector housing. In that case wiring will be included in the detection system hook-up which will allow enabling of the test circuitry when it is desired to check the system.

Finally, while the test lamp disclosed refers to an incandescent lamp, it is to be understood that any emitter means can be employed which emits radiant energy at each of the peak wavelengths of the photocells in the detector. For example, hot nichrome wire may be employed or other types of lamps besides the incandescent lamp.

Other modifications to the above will now be obvious to those skilled in the art. The invention is not to be limited by what is disclosed but rather by the scope of the claims which follow.

What is claimed is:

1. A test system for checking the sensitivity of a multiple channel optical infra red fire detecting system, including at least two photocells, the detecting system responsive to the relative quantity of incident radiant energy at at least two different peak wavelengths, the detecting system producing a warning signal when the relative quantity of incident radiation of two wavelengths exceeds a predetermined threshhold, the photocells positioned in the detector housing member and oriented and aligned therein to detect the incident radiant energy, the test system comprising:

(a) an aperture plate positioned on the detector housing member, the aperture plate including respective openings aligned with each photocell, the openings having sufficient minimum area and depth to allow the quantity of broad band radiation emanating from a fire to be equally received by each photocell;

(b) means for emitting radiant energy at each of the peak wavelengths of the photocells in the detector positioned in close proximity to each respective opening in said aperture plate, whereby radiant energy from said emitter means impinges on all photocells; and (c) electrical means for varying the power to the emitter means upon command, at least one predetermined opening in said aperture plate differently configured so as to allow a greater quantity of radiation from said emitter means to impinge on its respective photocell as compared to the emitter means radiation received by the other cell(s) via their corresponding opening(s), whereby as the power to the emitter means is varied the predetermined threshold of the detecting system is reached and the alarm signal activated.

2. The test system claimed in claim 1 wherein the emitter means is an incandescent lamp.

3. The test system claimed in claim 1 wherein the differently configured opening includes a segment of the periphery thereof in line between the emitter means and the respective photocell, said segment dimensioned whereby a greater quantity of radiation emanating from the emitter means is received by the corresponding photocell.

4. The test system claimed in claim 3 wherein the segment of the periphery is arcuate in shape and radially extending in the direction of the emitter means.

5. The test system of claim 1 wherein said electrical means for powering the emitter means can be automatically varied.

6. The test system claimed in claim 3 wherein said electrical means includes means for pulsing said emitter means at a predetermined test frequency, the predetermined threshhold including a predetermined incident radiant energy frequency requirement.

7. The test system claimed in claim 5 wherein said electrical means includes means for pulsing said emitter means at a predetermined test frequency, the predetermined threshhold including a predetermined incident radiant energy frequency requirement.

8. The test system claimed in claim 6 wherein the emitter means is fixedly mounted on the aperture plate.

9. The test system claimed in claim 7 wherein the emitter means is fixedly mounted on the aperture plate.

* * * * *